(12) United States Patent
Miller et al.

(10) Patent No.: US 11,579,365 B2
(45) Date of Patent: Feb. 14, 2023

(54) SILICON GRATING WITH AMORPHOUS SILICON PERTURBATION

(71) Applicant: ROCKLEY PHOTONICS LIMITED, Altrincham (GB)

(72) Inventors: Gerald Miller, Sierra Madre, CA (US); Abu Thomas, Simi Valley, CA (US); Andrea Trita, Pasadena, CA (US)

(73) Assignee: Rockley Photonics Limited

(*) Notice: Subject to any disclaimer, the term of this patent is extended or adjusted under 35 U.S.C. 154(b) by 0 days.

(21) Appl. No.: 17/230,864

(22) Filed: Apr. 14, 2021

(65) Prior Publication Data

US 2021/0325609 A1 Oct. 21, 2021

(30) Foreign Application Priority Data

Apr. 16, 2020 (GB) .................... 2005531

(51) Int. Cl.
*G02B 6/12* (2006.01)
*G02B 6/136* (2006.01)

(52) U.S. Cl.
CPC .... *G02B 6/136* (2013.01); *G02B 2006/12061* (2013.01); *G02B 2006/12097* (2013.01); *G02B 2006/12107* (2013.01)

(58) Field of Classification Search
CPC .............. G02B 2006/12097; G02B 6/02057
See application file for complete search history.

(56) References Cited

U.S. PATENT DOCUMENTS

| | | |
|---|---|---|
| 5,243,669 A | 9/1993 | Alferness et al. |
| 5,859,866 A | 1/1999 | Forrest et al. |
| 10,466,100 B2 * | 11/2019 | Cho .................. G01J 3/021 |
| 2007/0070276 A1 * | 3/2007 | Tan .................. H04N 9/3167 348/E9.027 |
| 2011/0090931 A1 * | 4/2011 | Murata .............. B82Y 20/00 359/575 |
| 2013/0016942 A1 | 1/2013 | Gubenko et al. |
| 2015/0063753 A1 * | 3/2015 | Evans ................ G02B 6/34 438/31 |

FOREIGN PATENT DOCUMENTS

| | | | |
|---|---|---|---|
| EP | 2 584 397 A1 | 4/2013 | |
| EP | 2 759 858 A2 | 7/2014 | |
| GB | 2 105 863 A | 3/1983 | |
| GB | 2 407 394 A | 4/2005 | |
| JP | 2003243764 A * | 8/2003 | ............ H01S 5/028 |
| JP | 2004020283 A * | 1/2004 | |

OTHER PUBLICATIONS

U.K. Intellectual Property Office Search and Examination Report, dated Sep. 25, 2020, for patent application No. GB2005531.5, 8 pages.

* cited by examiner

*Primary Examiner* — Charlie Y Peng
(74) *Attorney, Agent, or Firm* — Lewis Roca Rothgerber Christie LLP

(57) ABSTRACT

A waveguide grating. The waveguide grating includes a rib composed of a first material. A first portion of the waveguide has a first layer on the rib, the first layer being composed of a second material; and a second layer on the first layer, the second layer being composed of a third material, the third material having a higher index of refraction than the first material.

20 Claims, 6 Drawing Sheets

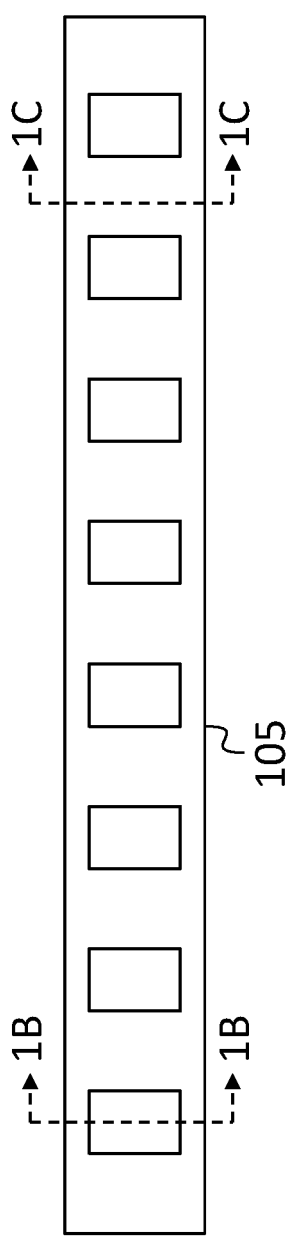
FIG. 1A
FIG. 1C
FIG. 1B

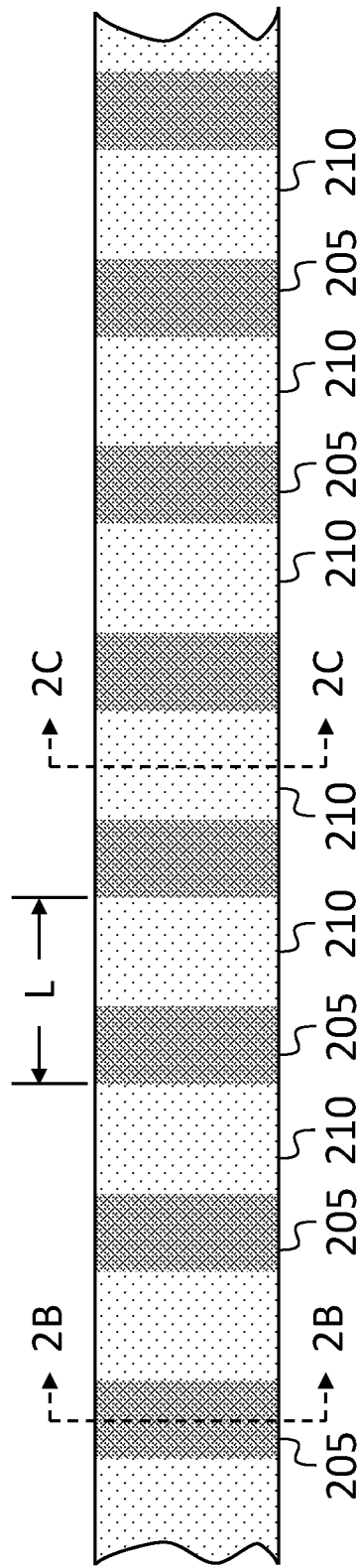
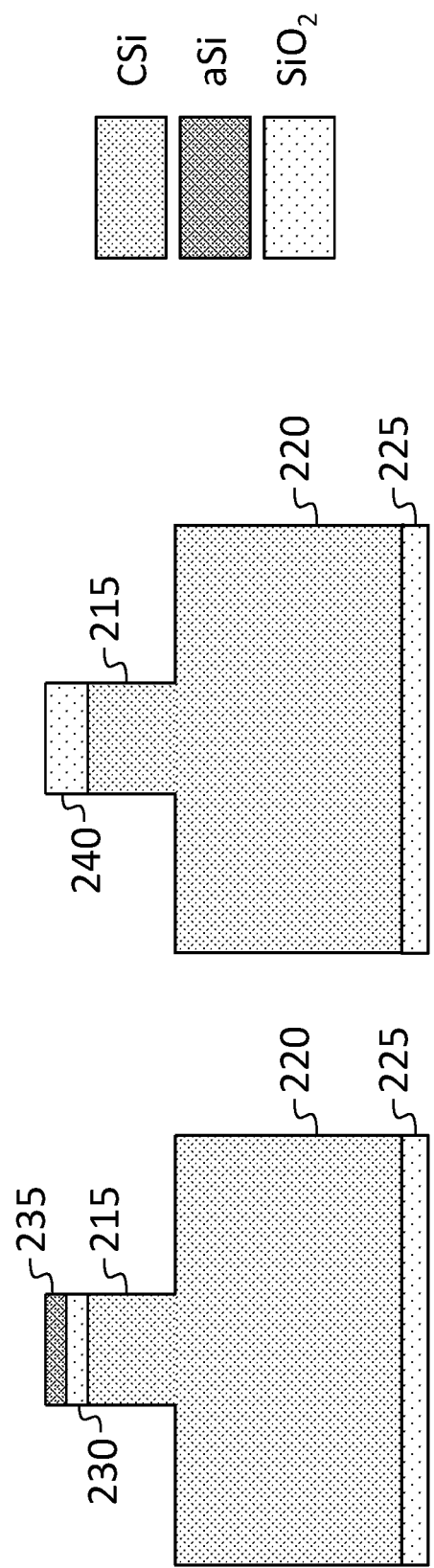
FIG. 2A
FIG. 2B
FIG. 2C
FIG. 2D

SILICON GRATING WITH AMORPHOUS SILICON PERTURBATION

CROSS-REFERENCE TO RELATED APPLICATION(S)

This application claims priority to United Kingdom Patent Application No. 2005531.5, filed in the United Kingdom Intellectual Property Office on Apr. 16, 2020, which is incorporated by reference herein in its entirety.

FIELD

One or more aspects of embodiments according to the present disclosure relate to silicon photonics, and more particularly to a waveguide grating suitable for use in a photonic integrated circuit.

BACKGROUND

Waveguide gratings find multiple applications in silicon photonics devices, including as components of filters, or wavelength-selective reflectors. Certain methods of fabricating waveguide gratings form structures that exhibit poor fabrication yields, for example because they include features that are fragile and easily damaged during the fabrication process.

Thus, there is a need for an improved waveguide grating.

SUMMARY

According to an embodiment of the present invention, there is provided a waveguide, including: a rib composed of a first material, a first portion of the waveguide having: a first layer on the rib, the first layer being composed of a second material; a second layer on the first layer, the second layer being composed of a third material, the third material having a higher index of refraction than the first material.

In some embodiments, the second material has a lower index of refraction than the first material, and the second material has a lower index of refraction than the third material.

In some embodiments, within the first portion, the width of the second layer is at least 0.9 of the width of the rib.

In some embodiments, the thickness of the first layer is less than 0.25 microns.

In some embodiments, the thickness of the second layer is at least 0.3 microns.

In some embodiments, the first material is silicon, the second material is silicon dioxide, and the third material is amorphous silicon.

In some embodiments, the third material is hydrogenated amorphous silicon.

In some embodiments, the first portion of the waveguide is immediately adjacent to, in a longitudinal direction of the waveguide, a second portion of the waveguide, the second portion having a structure different from that of the first portion.

In some embodiments, the second portion does not include the third material.

In some embodiments, the second portion includes the first layer and a third layer on the first layer, the thickness of the third layer being within 10% of the thickness of the second layer.

In some embodiments, the first portion and the second portion are part of a waveguide grating.

In some embodiments, the waveguide grating includes 100 cycles and the average period of the waveguide grating is within 20% of 220 nm.

In some embodiments, the length of the first portion is within 10% of the length of the second portion.

In some embodiments, the length of the first portion is within 10% of 1.2 times the length of the second portion.

In some embodiments, the waveguide has a first width at a first point along the waveguide grating and a second width at a second point along the waveguide grating, the first width being at least 1.2 times the second width.

In some embodiments, the first width is at least 1.5 times the second width.

According to an embodiment of the present invention, there is provided a method for fabricating a waveguide grating, the method including: forming a layer of amorphous silicon dioxide on a layer of silicon; forming a layer of amorphous silicon on the layer of amorphous silicon dioxide; removing a portion of the layer of amorphous silicon; and forming a waveguide in the layer of silicon, wherein a first portion of the waveguide is under amorphous silicon and a second portion of the waveguide is not under amorphous silicon.

In some embodiments, the method includes forming the waveguide before forming the layer of amorphous silicon dioxide and before forming the layer of amorphous silicon.

In some embodiments, the removing of the portion of the layer of amorphous silicon includes removing the layer of amorphous silicon with an etch for which silicon dioxide acts as an etch stop.

In some embodiments, the amorphous silicon is hydrogenated amorphous silicon.

BRIEF DESCRIPTION OF THE DRAWINGS

These and other features and advantages of the present disclosure will be appreciated and understood with reference to the specification, claims, and appended drawings wherein:

FIG. 1A is a top view of a waveguide grating, according to an embodiment of the present disclosure;

FIG. 1B is a cross sectional view of the embodiment of FIG. 1A, taken along section line 1B-1B, according to an embodiment of the present disclosure;

FIG. 1C is a cross sectional view of the embodiment of FIG. 1A, taken along section line 1C-1C, according to an embodiment of the present disclosure;

FIG. 2A is a top view of a waveguide grating, according to an embodiment of the present disclosure;

FIG. 2B is a cross sectional view of the embodiment of FIG. 2A, taken along section line 2B-2B, according to an embodiment of the present disclosure;

FIG. 2C is a cross sectional view of the embodiment of FIG. 2A, taken along section line 2C-2C, according to an embodiment of the present disclosure;

FIG. 2D is a legend, according to an embodiment of the present disclosure;

DETAILED DESCRIPTION

Figure 3A:
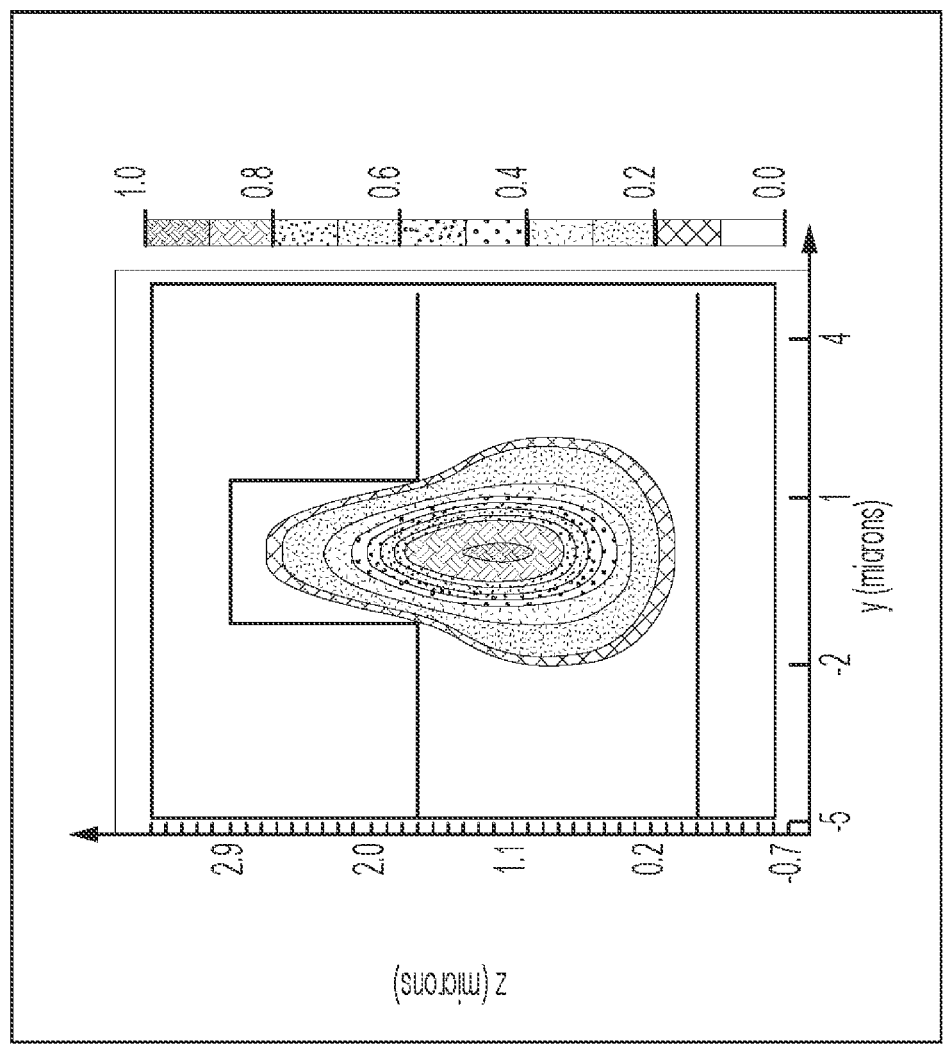
FIG. 3A is a mode diagram, according to an embodiment of the present disclosure.

The detailed description set forth below in connection with the appended drawings is intended as a description of exemplary embodiments of a waveguide grating provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

FIG. 1A shows a top view of a rib 105 of a waveguide grating, in some embodiments. To fabricate such a waveguide grating, rectangular recesses, or pockets, are etched into the top surface in a periodic pattern, such that the cross section of the waveguide varies periodically between that of FIG. 1B and that of FIG. 1C. The presence of the rectangular recesses may result in the cross section of the waveguide having "ears" 110 at some points along the length of the waveguide, as shown in FIG. 1B. Such ears may be relatively fragile and easily damaged during subsequent processing. Damage to the ears (and, in some cases, also to nearby portions of the rib) may alter the characteristics of the waveguide to an unacceptable extent, resulting in the failure of the photonic integrated circuit of which the waveguide grating is a part.

In some embodiments, instead of recesses being etched into a waveguide, a pattern (e.g., a periodic pattern) is formed on the rib, for example by depositing and etching a pattern on the top of the rib. FIGS. 2A-2D show such an embodiment, with a rib composed of a first material (e.g., crystalline silicon (CSi)). FIG. 2A shows a top view of the rib, the top surface of which has alternating rectangular regions of a second material (e.g., silicon dioxide ($SiO_2$) (e.g., amorphous silicon dioxide)) and a third material (e.g., amorphous silicon (aSi)). The waveguide may include a plurality of first portions 205 having the cross section shown in FIG. 2B, alternating with second portions 210 having the cross section shown in FIG. 2C. The amorphous silicon may be hydrogenated amorphous silicon, or it may be amorphous silicon that is not hydrogenated.

FIG. 2B is a cross section, through one of the first portions 205. In FIG. 2B, the waveguide includes a rib 215 on a slab 220, which is on a layer of silicon dioxide 225 (e.g., amorphous silicon dioxide, which may be the buried oxide (BOX) layer of a silicon-on-insulator (SOI) wafer on which the waveguide grating is fabricated). The BOX layer 225 may be about 1 micron thick. The slab 220 is not shown in FIG. 2A. The rib 215 and the slab 220 may be composed of crystalline silicon (e.g., they may be formed, by suitable patterning and etching, from the device layer (i.e., the upper silicon layer) of an SOI wafer. The first portion 205 includes a first layer of silicon dioxide (e.g., amorphous silicon dioxide) 230 on the rib, and a layer of amorphous silicon 235 (in the form of a rectangular patch, as shown in FIG. 2A) on the first layer of silicon dioxide 230. The amorphous silicon may have a higher index of refraction than the crystalline silicon of the rib, and it may have a higher index of refraction than the silicon dioxide. For example, for a wavelength range extending from 1.26 microns to 2.4 microns, the index of refraction of amorphous silicon may be between 3.5342 and 3.44, the index of refraction of crystalline silicon may be between 3.5072 and 3.4397, and the index of refraction of silicon dioxide may be between 1.4474 and 1.4316. The index of refraction of the amorphous silicon being higher than that of the crystalline silicon may result in increased grating strength for a given length of grating, making more compact devices possible.

FIG. 2C is a cross section through one of the second portions 210. As shown in FIG. 2C, the second portion 210 includes, instead of a layer of amorphous silicon 235, a second layer of silicon dioxide (e.g., amorphous silicon dioxide) on the first layer of silicon dioxide (or, equivalently, the second portion 210 includes a layer of silicon dioxide 240 on the rib 215 that is thicker than the first layer of silicon dioxide 230 of the first portion). As a result, the outer dimensions of the rib and the layer or layers on it in the first portion 205 and in the second portion 210 may be similar or the same, although the composition of the layer or layers on the rib 215 in the first portion 205 may differ from that or those of the second portion 210. In some embodiments, the outer dimensions, in the second portion 210, of the rib 215 and the layer or layers on it may differ from those in the first portion 205; for example, there may be no layers on the rib 215 in the second portion 210. FIG. 2D is a legend showing the patterns used to represent different materials in FIGS. 2A-2C.

In the embodiment of FIGS. 2A-2D, the optical mode propagating in the waveguide may extend, to some extent, into the layer or layers on the rib, and the optical mode may experience a different effective index of refraction in the second portions 210 than in the first portions 205. As such, if the first portions 205 and the second portions 210 form a periodically repeating pattern including a plurality of cycles, they may form a waveguide grating. Each cycle of the waveguide grating may include a first portion 205 and a second portion 210, and the waveguide grating may have an average period L (shown in FIG. 2A) (i.e., an average cycle length) of about 220 nm. In some embodiments, the first layer of silicon dioxide 230 is sufficiently thin (e.g., 150 nm or less) that its presence does not significantly reduce the overlap of the optical mode with the layer of amorphous silicon 235. As used herein, a "waveguide grating" is a waveguide having at least 10 cycles of alternating first and second portions, the first and second portions having different optical characteristics (e.g., a different effective index of refraction).

In some embodiments, the duty cycle of the waveguide grating (i.e., the ratio of (i) the length of each rectangular patch of amorphous silicon to (ii) the period of the grating) is about 50%. In some embodiments the duty cycle is greater than 50% (e.g., between 51% and 80%) or (as shown in FIG. 2A) less than 50%. The grating strength may be greatest (as a function of duty cycle) at a value of the duty cycle that is somewhat greater than 50% because the patches of amorphous silicon both (i) produce a periodic modulation of index of refraction for the portion of the light above the top of the rib and (ii) increase the proportion of light that is above the top of the rib.

FIGS. 2A-2C are not to scale. In some embodiments, the rib has a width of 3 microns, a height above the slab (which has a height of 1.8 microns above the BOX layer) of 1.2 microns, and a height above the BOX layer of 3 microns. In some embodiments the rib is thicker and the slab layer is corresponding thinner; in the limiting case in which the slab is absent or negligibly thick (e.g., 200 nm thick), the waveguide may be referred to as a "strip" waveguide. As used herein thickness refers to a dimension perpendicular to the plane of the wafer, length refers to a dimension in the longitudinal direction of the waveguide (i.e., the direction of propagation of light in the waveguide), and width refers to a dimension parallel to the plane of the wafer and perpendicular to the longitudinal direction of the waveguide. This convention is used, for example, for the rectangular patches of amorphous silicon even though the use of this convention has the effect that the longer dimension of each such rectangle, in an embodiment such as that of FIG. 2A, is referred to as the width of the rectangle, and the shorter dimension is referred to as its length.

Figure 3B:
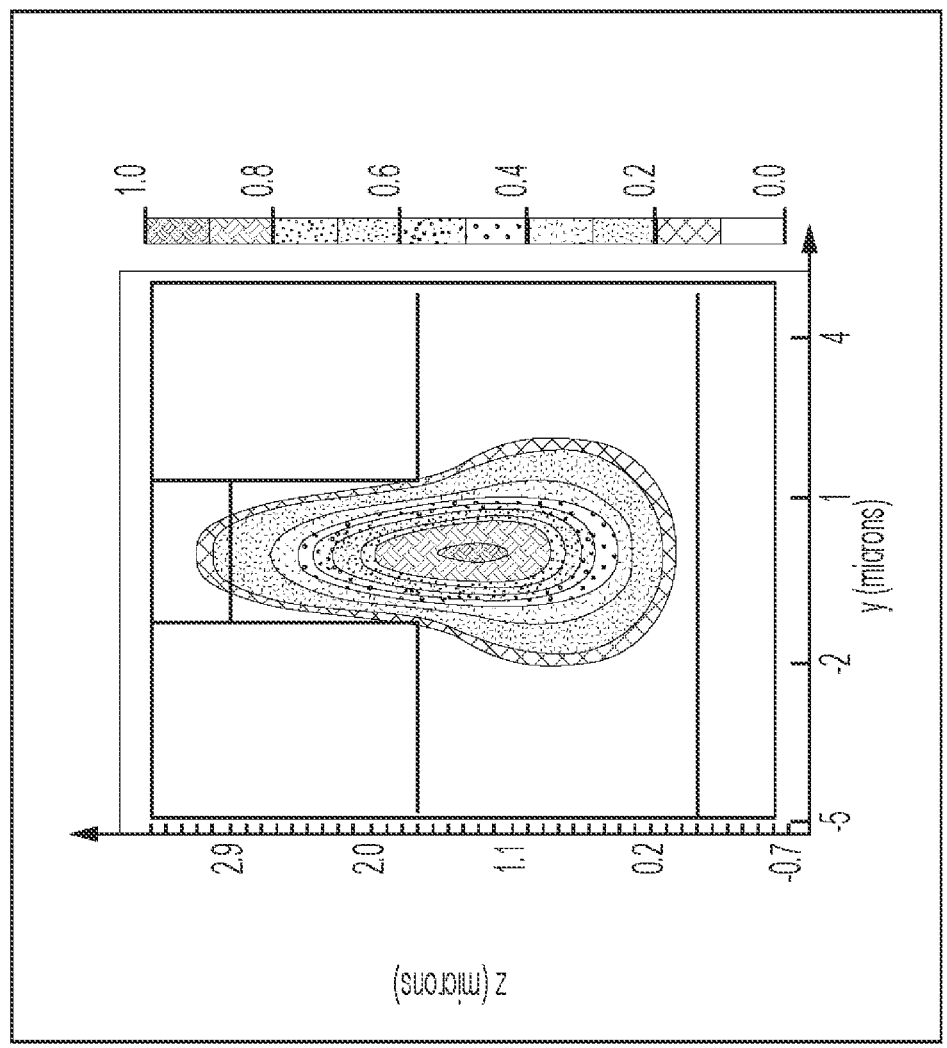
FIG. 3B is a mode diagram, according to an embodiment of the present disclosure.

FIGS. 3A and 3B show calculated mode patterns (irradiance as a function of transverse position within the waveguide) for (i) a rib waveguide with a top cladding layer of silicon dioxide and a bottom cladding layer of silicon dioxide (FIG. 3A) and (ii) a rib waveguide with a layer of amorphous silicon on top of the rib, silicon dioxide on both sides of the rib, and a bottom cladding layer of silicon dioxide (FIG. 3B). In both cases the bottom cladding layer of silicon dioxide may be the BOX layer of an SOI wafer. The model used to perform the calculation of FIG. 3B does not include the first layer of silicon dioxide 230 (which may be sufficiently thin to have little effect on the mode shape). The effect on the mode shape of the presence of the layer of amorphous silicon on top of the rib may be seen from the differences in mode shape between FIG. 3A and FIG. 3B.

Figure 4A:
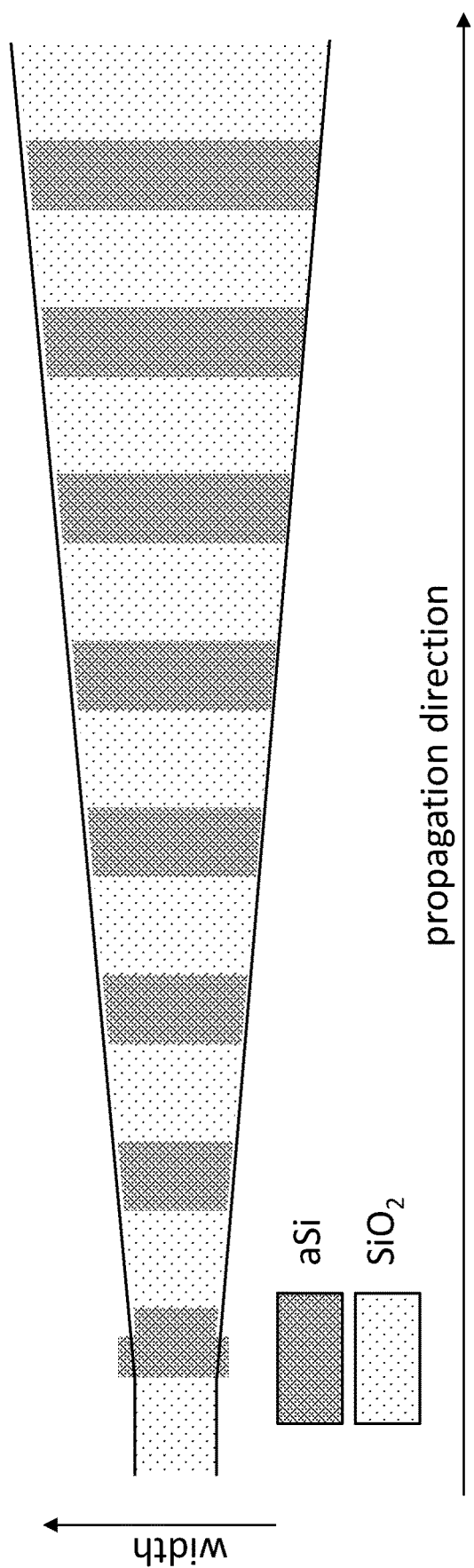
FIG. 4A is a top view of a waveguide grating, according to an embodiment of the present disclosure.
Figure 4B:
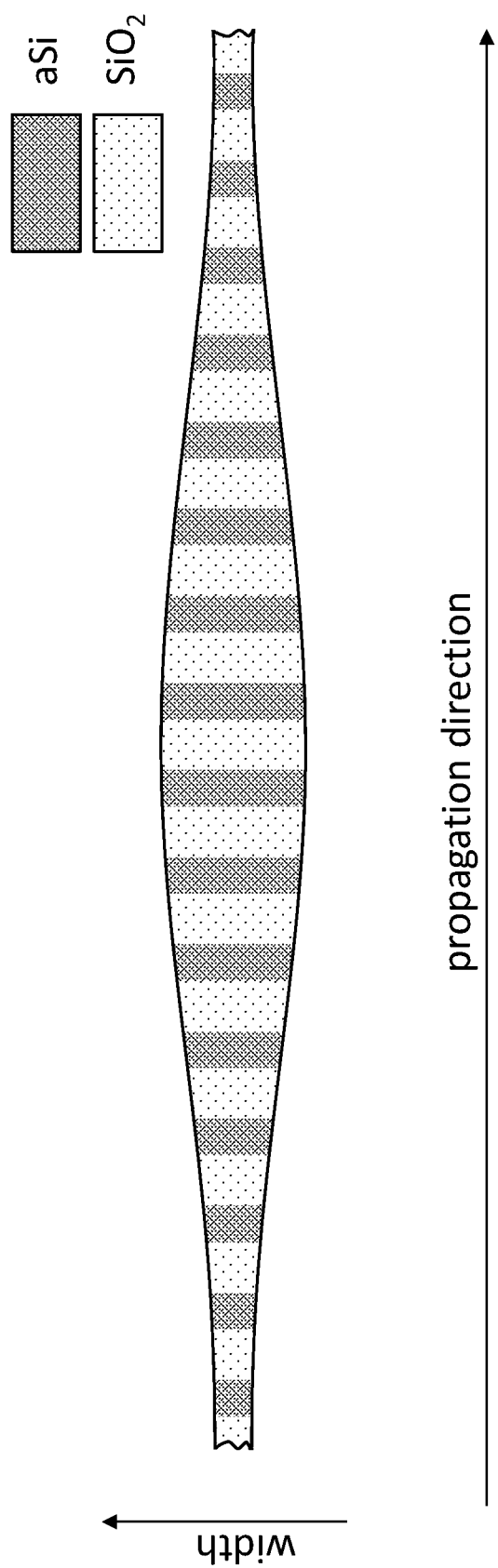
FIG. 4B is a top view of a waveguide grating, according to an embodiment of the present disclosure.

Referring to 4A, in some embodiments an apodized grating may be formed by varying the width of the waveguide along the longitudinal direction of the waveguide (i.e., the direction of propagation of light in the waveguide), as shown. In such an embodiment, the mode shape may change along the length of the waveguide, and, as a result, the extent to which the light interacts with the rectangular patches of amorphous silicon, and the grating strength, varies along the length of the waveguide. The width may vary linearly with distance along the waveguide (as shown in FIG. 4A), or it may be a different function of distance along the longitudinal direction, e.g., a cosine function or a spline, as shown in FIG. 4B. FIGS. 4A and 4B are not drawn to scale; in some embodiments, for example, the length of the waveguide grating is about 1 mm and it includes several thousand cycles. The width of the waveguide grating may vary, in an embodiment in which the waveguide grating is apodized, such that the ratio of the greatest width to the smallest width is between 1.05 and 3.00, e.g., such that the ratio is about 1.4. In some embodiments the widest part of an apodized grating has a width of 3.0 microns, and the narrowest part has a width of 2.2 microns. In some embodiments an apodized waveguide grating may be formed by varying the duty cycle of the grating along the waveguide instead of (or in addition to) varying the width of the waveguide.

In some embodiments a waveguide grating is fabricated as follows, from a silicon-on-insulator wafer. The rib of the waveguide may be formed first, using, e.g., a 1.2 micron deep etch with a hard mask on the rib. A layer of oxide (i.e., silicon dioxide) may then be deposited over the rib and the adjoining slab, and polished flat, so that the rib is buried within the silicon dioxide. In some embodiments, to leave a sufficiently thin layer of silicon dioxide on the top of the rib (e.g., a layer having a thickness of 150 nm or less) the chemical mechanical polishing (CMP) process module is optimized in the limited geometric area of the wafer where the waveguide gratings are defined. A layer of amorphous silicon may then be deposited on the silicon dioxide, and etched to form stripes perpendicular to the rib. These stripes may be as wide as the rib, or wider than the rib, or less wide than the rib (with a loss of grating strength if the stripes are less wide than the rib, i.e., if each stripe does not extend to both edges of the rib). During the process of etching the layer of amorphous silicon, the layer of silicon dioxide may act as an etch stop. Another layer of silicon dioxide may then be deposited, and polished, so that the top surface is relatively flat (and so that the total height of the rib and the layers on it is substantially the same in the first portions 205 and in the second portions 210, as illustrated in FIGS. 2A-2D). In other embodiments, the waveguide may be fabricated later in the process. For example, a layer of silicon dioxide may be formed on the device layer of a silicon-on-insulator wafer (e.g., by depositing the silicon dioxide, or by performing thermal oxidation of the top surface of the device layer), a layer of amorphous silicon may be deposited on the layer of silicon dioxide, the amorphous silicon may be etched to form a plurality of parallel stripes perpendicular to the planned path of the waveguide, and the material on both sides of the planned path of the rib may be etched away, leaving (i) a slab of the desired thickness, (ii) the rib on the slab, (iii) a layer of silicon dioxide on the rib, and (iv) regularly spaced rectangular patches of amorphous silicon on the layer of silicon dioxide.

A waveguide grating according to some embodiments may be used as a wavelength selective reflector (e.g., as a back mirror or as an output mirror) in a laser (e.g., in a laser including a semiconductor optical amplifier (SOA) which may be a separate III-V chip on the silicon photonic integrated circuit). A waveguide grating may also be used in data communications or in optical sensors as a band-pass filter in optical receivers, or in optical quantum computing, to project a (time-bin or frequency-encoded) qubit into a well-defined eigen state in frequency basis.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the term "rectangle" includes a square as a special case, i.e., a square is an example of a rectangle. As used herein, when a second number is "within Y %" of a first number, it means that the second number is at least $(1-Y/100)$ times the first number and the second number is at most $(1+Y/100)$ times the first number.

As used herein, the word "or" is inclusive, so that, for example, "A or B" means any one of (i) A, (ii) B, and (iii) A and B. Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

As used herein, a "major component" is a component that is present in a composition or product in an amount greater than an amount of any other single component in the composition or product. A "primary component" is a component that makes up at least 50% by weight or more of the composition or product. As used herein, any structure or layer that is described as being "made of" or "composed of"

a substance should be understood (i) in some embodiments, to contain that substance as the primary component or (ii) in some embodiments, to contain that substance as the major component.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present. When an element or layer is referred to as being "between" other elements or layers, it may be immediately between the other elements or layers, or other intervening elements or layers may be present. In contrast, when an element or layer is referred to as being "immediately" between two other elements, no intervening elements are present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a waveguide grating have been specifically described and illustrated herein, many modifications and variations will be apparent to those skilled in the art. Accordingly, it is to be understood that a waveguide grating constructed according to principles of this disclosure may be embodied other than as specifically described herein. The invention is also defined in the following claims, and equivalents thereof.

What is claimed is:

1. A waveguide, comprising:
   a rib composed of a first material,
   a first portion of the waveguide having:
      a first layer on the rib, the first layer being composed of a second material; and
      a second layer on the first layer, the second layer being composed of a third material, the third material having a higher index of refraction than the first material, and
   a second portion of the waveguide being immediately adjacent to, in a longitudinal direction of the waveguide, the first portion, and having a structure different from that of the first portion,
   wherein a height of the rib in the first portion and a height of the rib in the second portion are substantially equal.

2. The waveguide of claim 1, wherein the second material has a lower index of refraction than the first material, and the second material has a lower index of refraction than the third material.

3. The waveguide of claim 1, wherein within the first portion, the width of the second layer is at least 0.9 of the width of the rib.

4. The waveguide of claim 1, wherein the thickness of the first layer is less than 0.25 microns.

5. The waveguide of claim 1, wherein the thickness of the second layer is at least 0.3 microns.

6. The waveguide of claim 1, wherein the first material is silicon, the second material is silicon dioxide, and the third material is amorphous silicon.

7. The waveguide of claim 6, wherein the third material is hydrogenated amorphous silicon.

8. The waveguide of claim 1, wherein the second portion does not include the third material.

9. The waveguide of claim 1, wherein the second portion includes the first layer and a third layer on the first layer, the thickness of the third layer being within 10% of the thickness of the second layer.

10. The waveguide of claim 1, wherein the first portion and the second portion are part of a waveguide grating.

11. The waveguide of claim 10, wherein the waveguide grating comprises 100 cycles and the average period of the waveguide grating is within 20% of 220 nm.

12. The waveguide of claim 10, wherein the length of the first portion is within 10% of the length of the second portion.

13. The waveguide of claim 10, wherein the length of the first portion is within 10% of 1.2 times the length of the second portion.

14. The waveguide of claim 10, wherein the waveguide has a first width at a first point along the waveguide grating and a second width at a second point along the waveguide grating, the first width being at least 1.2 times the second width.

15. The waveguide of claim 14, wherein the first width is at least 1.5 times the second width.

16. A method for fabricating a waveguide grating, the method comprising:
   forming a layer of amorphous silicon dioxide on a layer of silicon;
   forming a layer of amorphous silicon on the layer of amorphous silicon dioxide;
   removing a portion of the layer of amorphous silicon; and
   forming a waveguide in the layer of silicon, the waveguide comprising a rib composed of silicon,
   wherein a first portion of the waveguide is under amorphous silicon and a second portion of the waveguide immediately adjacent to, in a longitudinal direction of the waveguide, the first portion is not under amorphous silicon, and
   wherein a height of the rib in the first portion and a height of the rib in the second portion are substantially equal.

17. The method of claim 16, comprising forming the waveguide before forming the layer of amorphous silicon dioxide and before forming the layer of amorphous silicon.

18. The method of claim 16, wherein the removing of the portion of the layer of amorphous silicon comprises removing the layer of amorphous silicon with an etch for which silicon dioxide acts as an etch stop.

19. The method of claim 16, wherein the amorphous silicon is hydrogenated amorphous silicon.

20. A waveguide, comprising:
   a rib composed of a first material,
   a first portion of the waveguide having:
      a first layer on the rib, the first layer being composed of a second material; and
      a second layer on the first layer, the second layer being composed of a third material, the third material having a higher index of refraction than the first material, and
   a second portion of the waveguide being immediately adjacent to, in a longitudinal direction of the waveguide, the first portion, and having a layer of the second material directly on the rib, wherein a height of an upper surface of the layer of the second material in the second portion is greater than a height of an upper surface of the first layer in the first portion.

* * * * *